Nov. 20, 1923.
J. H. DEAN
1,474,407
FRICTION LOCK NUT
Filed Nov. 13, 1922
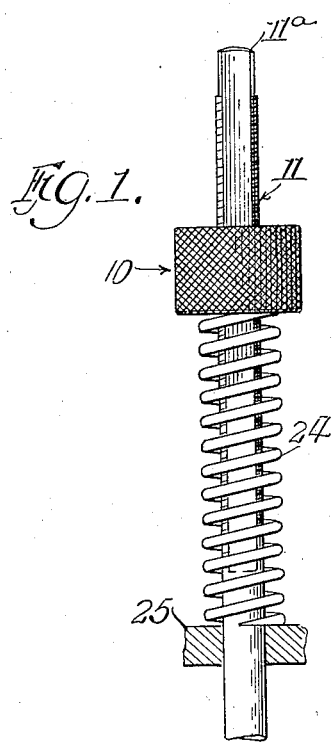
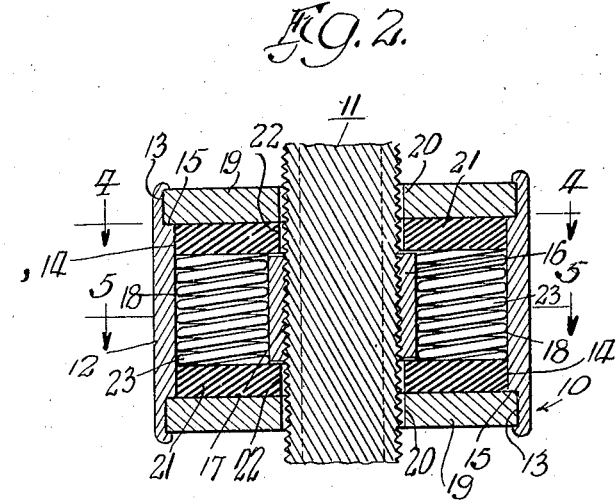
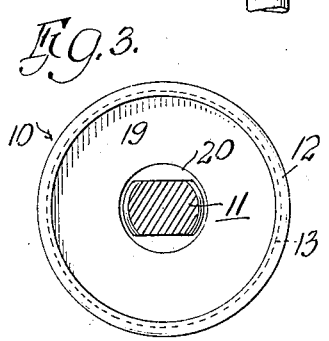
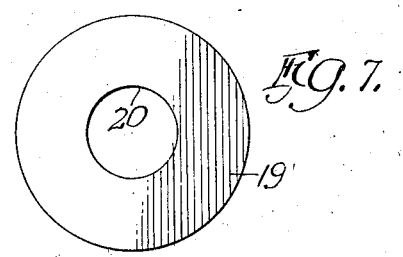
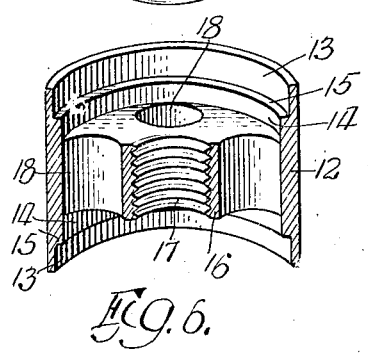
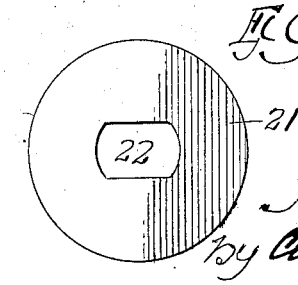
Inventor
James H. Dean
by Clarence E. Mehlhope
Atty.

Patented Nov. 20, 1923.

1,474,407

UNITED STATES PATENT OFFICE.

JAMES H. DEAN, OF LUDINGTON, MICHIGAN, ASSIGNOR TO NORTHWESTERN EXPANDED METAL COMPANY, OF CHICAGO, ILLINOIS, A CORPORATION OF ILLINOIS.

FRICTION LOCK NUT.

Application filed November 13, 1922. Serial No. 600,552.

*To all whom it may concern:*

Be it known that I, JAMES H. DEAN, a citizen of the United States, and a resident of Ludington, county of Mason, and State of Michigan, have invented certain new and useful Improvements in Friction Lock Nuts; and I do hereby declare that the following is a full, clear, and exact description thereof, reference being had to the accompanying drawings, and to the letters of reference marked thereon, which form a part of this specification.

This invention relates to a novel and improved friction lock nut and consists of the matters hereinafter described and more particularly pointed out in the appended claims.

The object of the invention is to produce a nut with a self-contained friction lock, which will act, independently of the thread, to obstruct and prevent the rotative, unscrewing movement usually brought about by the vibration of the bolt to which it is applied.

A further object of the invention is to produce a nut of the kind, which is of cheap and economical construction and which comprises few parts capable of ready and easy assembly.

These and other objects and advantages of the invention will appear more fully as I proceed with my specification.

In the drawings:—

Fig. 1 is a view in side elevation of the improved nut threaded upon a bolt against an expansion, coiled spring.

Fig. 2 is a view representing, on an enlarged scale, a central section through the nut and bolt.

Fig. 3 is a top plan view of the parts shown in Fig. 2.

Fig. 4 is a view representing a transverse section through the nut and bolt in a plane indicated by the line 4—4 of Fig. 2.

Fig. 5 is a similar view in a plane indicated by the line 5—5 of Fig. 2.

Fig. 6 is a perspective, longitudinal sectional view of the body of the improved nut, with its heads removed.

Fig. 7 is a plan view of a disc which forms one head of the improved nut.

Fig. 8 is a plan view of one of the friction members included in the nut.

The improved nut comprises essentially two primary members, namely, a threaded member, which is the nut proper, hereinafter to be referred to as the nut body, and a feather member contained within or connected to the body and frictionally engaged therewith so that said body is capable of frictional, rotative movement relative to said feather member but is incapable of endwise movement with reference thereto. Means is provided either in the parts themselves, or by additional devices, preferably by separate springs, as shown herein, for inducing a predetermined degree or amount of friction between the two primary members of the nut.

When applied to the bolt, the feather member is capable of a longitudinal movement thereon, but is locked against rotative movement by reason of the fact that it is feathered to the bolt. The frictional engagement between the nut body and the feather member thus acts to resist the rotative movement of the nut body on the bolt and this resistance holds the nut against the usual undesirable rotation tending to result from the vibration of the bolt.

In the nut as shown herein, the feather member is duplex, there being two feather members, one adjacent each head of the nut; and for convenience of manufacture and assembly, the nut heads against which said feather members are held in frictional engagement, are made separately from the main nut body which contains the threaded aperture of the nut.

Referring now in detail to that embodiment of the invention illustrated in the accompanying drawings:—10 indicates the improved nut as a whole and 11 indicates the bolt to which it is applied. 12 indicates the nut body. The invention is shown herein in the form of a thumb nut with a cylindrical, knurled body, but as will be manifest, the outward form of the nut may be of any suitable shape, as desired.

The nut body 12 has at each end a recess having a part 13 of large diameter at its outer end and a part 14 of somewhat less diameter in a plane spaced from said end,— a radial shoulder 15 defining the plane between the recess-parts of different diameters. 16 indicates the intermediate part of the nut body, which is provided with a thread 17 to fit the bolt to which the nut is to be applied. 19, 19 indicate the two heads of the nut. Each head is a disc fixed within the outer recess part 13 against the radial shoulder 15. As illustrated, the recess part 13, is made somewhat deeper than the thickness of the disc 19, so that the metal of the nut body will project beyond the outer face of the disc to be upset about the edge of the disc and fix it in the recess, after the other parts of the nut have been assembled. The disc 19 has a hole 20 of slightly larger diameter than that of the thread 17, so that when the nut is applied to the bolt, the bolt may pass freely through the hole 20.

21, 21 indicate two discs, which are interposed between the flat ends of the intermediate part 16 of the nut body and the adjacent discs or heads 19. Said discs 21 are provided with holes 22 so formed with reference to the cross section of the bolt, that, when applied to the bolt, they will be non-rotative thereon, while being capable of a free movement longitudinally of the bolt. As shown the holes 22 have two opposed flat sides (see Fig. 8) adapted to engage similar flat sides of the bolt.

The two discs 21 constitute the feather member of the nut and are held in frictional engagement, each with the proximate head 19 of the nut, by a plurality of expansion, coiled springs 23, which are mounted in holes or bores 18 extending longitudinally through the intermediate part 16 of the nut body and bear at their ends against the inner faces of the discs 21. As shown, four of such springs are used, arranged symmetrically about the central axis of the nut.

In assembling the parts, a disc 21 and head 19 are applied to one end of the nut,— the head being fixed in place as described, or in other convenient manner. The springs 23 are then inserted in the bores 18 of the nut body and the second disc 21 and head 19 are applied to the other end of the nut in the same manner. This completes the assembling of the nut.

The operation of the improved nut is as follows: The nut is engaged upon the end 11ª of the bolt 11, which end is slightly reduced in diameter so that the flat sided holes 22 in the friction discs may be brought into register with the flat sides of the bolt, after which the nut is threaded upon the bolt in the usual manner.

The springs 23 hold the discs 21 in close, frictional engagement against the heads 19; and as the discs 21 are non-rotative on the bolt, the frictional engagement between said discs and heads is great enough to overcome the turning movement of the nut body on the bolt due to the vibration of the bolt or other cause, but is not sufficient to prevent the nut from being turned upon the bolt, when it is required to screw or unscrew the nut in the ordinary way.

In Fig. 1 the nut is shown as used to adjust the tension in a coiled spring 24 surrounding a bolt and abutting against a fixed part 25 of a machine, which is subjected to vibration in its operation. This illustrates a situation in which the use of the nut is of great value.

It will be noted from the foregoing, that one of the primary advantages of the improved nut is that the friction lock embodied therein has no effect whatever upon the threads of the bolt to which the nut is applied, being greatly superior in this respect to friction nuts of various kinds heretofore which act by means of a grip directly upon the thread of the bolt.

While in describing my invention I have referred to several details of construction and arrangement as contained in the preferred embodiment thereof, it is to be understood that the invention is in no way limited thereto except as may be pointed out in the appended claims.

I claim as my invention:

1. A friction lock nut, comprising a threaded body member and a friction feather member connected thereto and coacting therewith.

2. A friction lock nut, comprising a threaded body member and a friction feather member contained therein and coacting therewith.

3. A friction lock nut, comprising a threaded body member and a feather member, said two members being locked together against relative endwise movement but being capable of relative frictional, rotative movement.

4. A friction lock nut, comprising a threaded body member, a feather member associated therewith, and means holding said members together against relative endwise movement but permitting relative frictional, rotative movement.

5. A friction lock nut, comprising a threaded member and a feather member, means holding said members is fixed endwise relation but permitting relative rotative movement, and yielding means adapted to produce frictional engagement between said two members.

6. A friction lock nut, comprising a threaded member and a feather member, means holding said members together against relative endwise movement, said members including engaged friction discs, and spring means adapted to hold said friction discs in engagement.

7. A friction lock nut, comprising a threaded body, a head for said body, a friction feather member engaged with said head, and spring means in said body adapted to hold said feather member in frictional engagement with said head.

8. A friction lock nut, comprising a threaded body member recessed at its ends, feather members located in said recesses, heads closing the outer ends of said recesses, and springs carried by said body and acting to hold said feather members in engagement with said heads.

9. A nut, comprising a body adapted to be threaded upon a bolt, and means carried by said body providing a frictional resistance against a relative turning movement between said nut body and bolt, without imposing a strain upon the threads of said body or bolt.

10. A nut, comprising a body adapted to be threaded upon a bolt, means movable with the nut body longitudinally of the bolt but non-rotative with respect to said bolt, for imparting a frictional resistance to the nut body against a relative turning movement between said nut body and bolt.

11. A nut, comprising a body adapted to be threaded upon a bolt, and means coacting between the nut body and bolt for resisting the relative turning movement between them without imposing a strain on the threads of either the bolt or nut.

12. A nut, comprising a body adapted to be threaded upon a bolt, a member carried by the nut and non-rotative with respect to the bolt for frictionally engaging a fixed part of the nut body, and means for holding said member in frictional engagement with said body part.

13. A nut, comprising a body adapted to be threaded upon a bolt, means providing a head at one end of the bolt, a disc movable with the nut body but non-rotative with respect to the bolt, and spring means within the nut body for holding said disc in close frictional engagement with said head.

14. A nut, comprising a nut body, said body having a threaded center hole and a plurality of pockets spaced about said center hole, a disc fixed in each end of said nut body and rotative therewith, friction discs in said nut body and engaged with said end discs, said friction discs being endwise movable but non-rotative with respect to said bolt, and expansion coiled springs in said pockets and engaging said friction discs for urging them into close contactual engagement with said head discs.

15. A nut, comprising a nut body having an annular shoulder at each end, and discs engaged upon said shoulders, parts of said body beyond said shoulders being upset upon said end discs to secure them to said head, friction discs within said body arranged for longitudinal but non-rotative movement on said bolt, said friction discs having a face to face engagement with said head discs, and coiled expansion springs located in said body between said friction discs and urging them into close contactual engagement with said head discs.

In testimony that I claim the foregoing as my invention, I affix my signature, this 8 day of November, A. D. 1921.

JAMES H. DEAN.

Witnesses:
E. H. MOWEN,
ADELAIDE DEAN.